United States Patent [19]

Mizutani et al.

[11] 4,226,636
[45] Oct. 7, 1980

[54] PRODUCTION OF CALCIUM SILICATE HAVING HIGH SPECIFIC BULK VOLUME AND CALCIUM SILICATE-GYPSUM COMPOSITE

[75] Inventors: Yukio Mizutani, Tokuyama; Yoshiaki Watanabe, Hikari; Genji Taga, Shinnanyo, all of Japan

[73] Assignee: Tokuyama Soda Kabushiki Kaisha, Yamaguchi, Japan

[21] Appl. No.: 974,523

[22] Filed: Dec. 29, 1978

[30] Foreign Application Priority Data

Dec. 30, 1977 [JP] Japan .................. 52-160031
Aug. 30, 1978 [JP] Japan .................. 53-104988
Dec. 18, 1978 [JP] Japan .................. 53-154889

[51] Int. Cl.² ............................................. C09C 1/02
[52] U.S. Cl. ................................................ 106/306
[58] Field of Search ..................................... 106/306

[56] References Cited

U.S. PATENT DOCUMENTS 2,679,463  5/1954  Alexander et al. ............. 106/306

*Primary Examiner*—James Poer
*Attorney, Agent, or Firm*—Wenderoth, Lind & Ponack

[57] ABSTRACT

A process for producing calcium silicate of the rational formula $2CaO.3SiO_2.nSiO_2.mH_2O$ wherein m is a number of more than 0, and n is a number of 0.1 to 10 from a silicate compound and a calcium compound, which comprises contacting a water-soluble silicate compound with a calcium compound in an aqueous medium, and heating them to a temperature of 150° to 250° C., the amount of the aqueous medium being 5 to 100 times the weight of the calcium silicate obtained, and a process for producing calcium silicate or a calcium silicate-gypsum composite, which comprises adding a water-soluble silicate or its aqueous solution gradually to an aqueous suspension of gypsum, and heating the mixture to a temperature of 150° to 250° C. The calcium silicate and the calcium silicate-gypsum composite, which have a structure composed of an assembly of petal-like flakes, are useful as an adsorbent carrier, a delusterant or a filtration aid.

13 Claims, 14 Drawing Figures

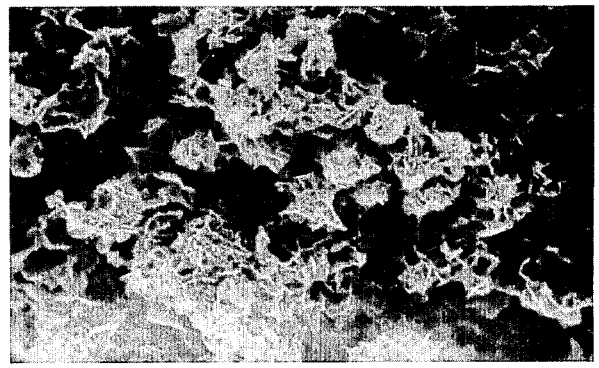
Fig.4-A
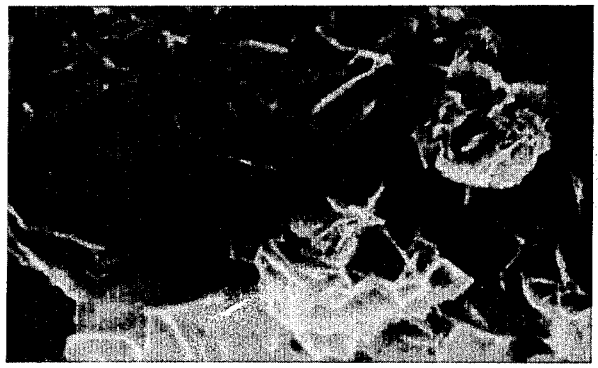
Fig.4-B
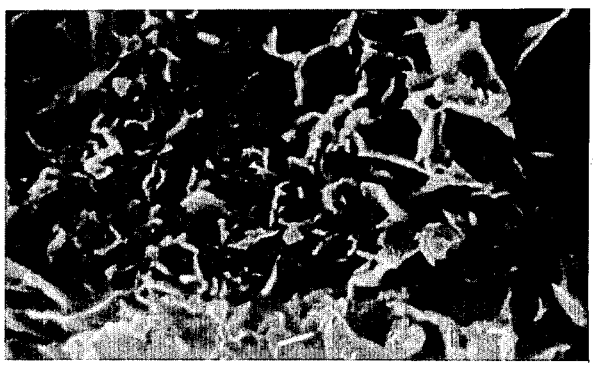
Fig.6

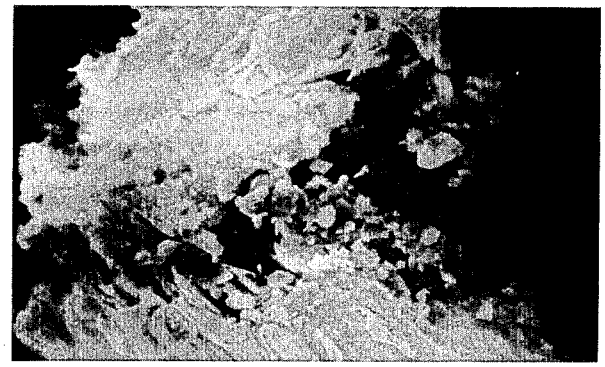
Fig. 5-A
Fig. 5-B
Fig. 7

PRODUCTION OF CALCIUM SILICATE HAVING HIGH SPECIFIC BULK VOLUME AND CALCIUM SILICATE-GYPSUM COMPOSITE

This invention relates to a novel process for producing calcium silicate, and more specifically, to a process for producing calcium silicate and a calcium silicate-gypsum composite having a petal-like structure which possess a very high specific bulk volume and can absorb a very large amount of oil.

BRIEF DESCRIPTION OF THE DRAWINGS

FIGS. 4-A and 4-B are electron microphotographs of the calcium silicate of the invention.

FIGS. 5-A and 5-B are electron microphotographs of plate-like flakes of calcium silicate.

FIG. 6 is an electron microphotograph of the calcium silicate of the invention.

FIG. 7 is an electron microphotograph of the calcium silicate of the invention.

Figure 1:
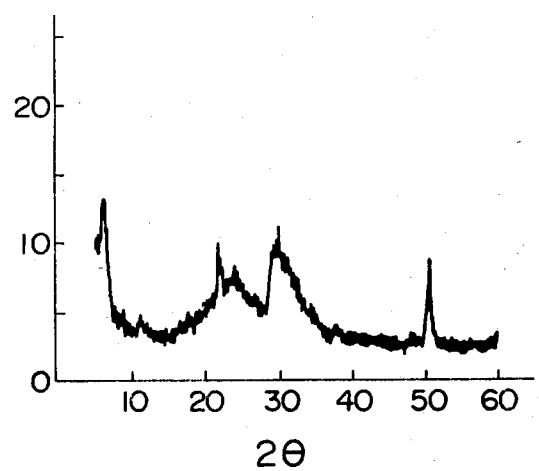
FIG. 1 is an X-ray diffraction pattern of a calcium silicate of the invention.

Calcium silicate has been widely used in the field of building materials, fillers, and the like. It is known to include xonotolite, tobermorite, gyrolite, etc. classified according to the form of crystals.

The calcium silicate provided by this invention is gyrolite-type calcium silicate which has the structure resulting from the bonding of n moles of amorphous silicon dioxide $SiO_2.xH_2O$ to $2CaO.3SiO_2.2H_2O$, and is expressed by the following rational formula

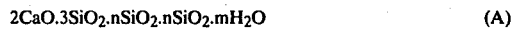

$$2CaO.3SiO_2.nSiO_2.nSiO_2.mH_2O \quad (A)$$

wherein m is a number of more than 0 and n is a number of 0.1 to 10.

U.S. Pat. No. 2,966,441 discloses a low solubility hydrated calcium silicate product of the type represented by the above rational formula, which comprises a mixture of the low solubility hydrated calcium silicate compound $2CaO.3SiO_2.1-2.5H_2O$ and hydrous silica resulting from the reaction of an aqueous slurry of lime and a siliceous material in a $CaO/SiO_2$ molar ratio within the range of 0.05 to 0.7 CaO to 1 $SiO_2$ at a predetermined temperature and for a predetermined period of time. The calcium silicate of the U.S. Patent is prepared by reacting the aforesaid aqueous slurry of lime and a substantially water-insoluble siliceous material for a predetermined period of time at a predetermined temperature. The use of a water-insoluble siliceous material as a starting material cannot afford calcium silicate having a sufficiently high specific bulk density and a sufficiently large amount of oil absorption.

It has now been found surprisingly that when a water-soluble silicate compound is used as a starting material and reacted in the solubilized state in an aqueous medium with a calcium compound under specified conditions, calcium silicate of the type expressed by rational formula (A) can be obtained which has a very high specific bulk volume and a very large amount of oil absorption which have not been achieved heretofore.

Thus, according to this invention, there is provided a process for producing calcium silicate having the rational formula $2CaO.3SiO_2.nSiO_2.mH_2O$ wherein m is a number of more than 0, and n is a number of 0.1 to 10 from a silicate compound and a calcium compound; wherein the silicate compound is a water-soluble silicate compound, and the water-soluble silicate compound is contacted with the calcium compound in an aqueous medium, and heated at a temperature of 150° to 250° C., the amount of the aqueous medium being 5 to 100 times the weight of the resulting calcium silicate.

The calcium silicate of rational formula (A) provided by this invention looks like an assembly of a number of thin flakes resembling rose petals, and is chemically composed of gyrolite-type calcium silicate and amorphous silicon dioxide. The gyrolite-type calcium silicate and amorphous silicon dioxide are not present as a mere blend, but the amorphous silicon dioxide is taken into the crystal structure of the gyrolite-type calcium silicate and they are bonded to each other by some binding force.

The use of a water-soluble silicate compound as the starting siliceous material is critical in the process of this invention.

The water-soluble silicate compound as starting material has a water-solubility of at least 30 g/100 cc of water at 1 atmosphere and 25° C. Suitable water-soluble silicates include alkali metal silicates such as sodium silicate, potassium silicate and lithium silicate and water-soluble alkaline silicates such as ammonium silicate. Of these, sodium silicate and potassium silicate are preferred.

The calcium compound need not always be water-soluble, and those having a water solubility of at least 0.05 g/100 cc of water are used. For example, calcium chloride, calcium hydroxide, calcium nitrate, quicklime and gypsum can be used. Of these, calcium chloride is preferred.

According to the process of this invention, the water-soluble silicate compound and the calcium compound are reacted in an aqueous medium, preferably water.

It is important that in the present invention, the water-soluble silicate compound should be contacted with the calcium compound while the former is being substantially dissolved in the aqueous medium. This, according to a preferred embodiment, an aqueous solution of the silicate compound is mixed with an aqueous solution or suspension of the calcium compound.

Generally, when the water-solubilized silicate compound is contacted with the calcium compound in aqueous medium, they sometimes begin to react without particularly heating them and form calcium silicate of the composition represented by rational formula (A). However, the calcium silicate thus obtained is substantially amorphous, and in this state, it does not have the aforesaid rose petal-like appearance and has a low specific bulk volume.

According to this invention, an aqueous mixture of the silicate compound and the calcium compound is heated at 150° to 250° C., preferably 170° to 210° C., to grow the calcium silicate into crystals having the rose petal-like structure. If the heating temperature is lower than 150° C., long periods of time are required until calcium silicate having a rose petal-like structure and a high specific bulk volume is formed. When the temperature exceeds 250° C., the formation of the desired calcium silicate having a petal-like structure and a high specific bulk volume is sometimes incomplete.

This heating treatment will be sometimes referred to hereinbelow as "hydrothermal treatment".

The time required until calcium silicate having a high specific bulk volume is formed differs according to the types of the starting materials, the temperature, the reaction means, etc. and cannot be definitely limited. Generally, it is 1 to 50 hours. When the treating time is too long, the specific bulk volume and the amount of oil absorption of the resulting calcium silicate generally tend to decrease. It is preferred therefore to determine by a routine test a suitable treating time for a specific set of reaction conditions used.

Since the hydrothermal treatment described above is generally performed at a temperature higher than the boiling point of water, it is generally effected in an autoclave under the vapor pressure of water.

The calcium silicate formed by the reaction of this invention is substantially water-insoluble and deposits as a powder in aqueous medium. It is important in this invention that the amount of the aqueous medium be restricted to 5 to 100 times, preferably 15 to 70 times, the weight of the resulting calcium silicate.

If the aqueous medium/calcium silicate weight ratio is extremely low, the resulting calcium silicate does not fully grow to a petal-like structure and sometimes it is obtained as a mass. If, on the other hand, this ratio becomes extremely high, the resulting calcium silicate may consist only of gyrolite-type calcium silicate ($2CaO.3SiO_2.2H_2O$) without a petal-like structure.

In the production of calcium silicate having petal-like structure and a high specific bulk volume, it is important that silicon dioxide should be present in the reaction system when the gyrolite-type calcium silicate ($2CaO.3SiO_2.2H_2O$) moiety of the rational formula (A) is to be formed. This can be seen from the fact that the calcium silicate having a petal-like structure cannot be obtained by preparing gyrolite-type calcium silicate and silicon dioxide separately, and heat-treating a mixture of these. It is necessary therefore to use conditions which will liberate free silicon dioxide in the reaction sytem at the time of reacting the starting materials. For example, when sodium silicate is used as the silicate compound and slaked lime or quicklime is used as the calcium compound, the mere contact of sodium silicate and slaked lime or quicklime in stoichiometrical amounts required to form gyrolite-type calcium silicate does not result in the liberation of silicon dioxide. In such a case, it is desirable to add a mineral acid before the start of the hydrothermal treatment to decompose sodium silicate present and thus to liberate silicon dioxide.

The ratio between the starting materials in this invention is not critical, but as is clearly seen from the rational formula (A) given hereinabove, the theoretical molar ratio of $SiO_2/CaO$ is from 1.55 to 6.5. However, because the yield of the product somewhat differs according to the types of the starting materials, the reaction temperature, the reaction time, the ratio of water [$H_2O/(CaO+SiO_2)$], etc., it is preferred to ascertain by routine experiments the relation between the $SiO_2/CaO$ molar ratio in the product and that in the starting materials. Furthermore, when the $SiO_2/CaO$ molar ratio in calcium silicate of rational formula (A) increases, it sometimes happens, depending upon the conditions for the formation of calcium silicate, that amorphous silicon dioxide generally assumes a spherical form mixed among the petals of the petal-like assembly. It is preferred therefore to set an optimum $SiO_2/CaO$ molar ratio in the starting materials for various sets of conditions by performing small-scale experiments.

Generally, the final product can be obtained in a yield of nearly 100% by choosing suitable conditions, and therefore, the $SiO_2/CaO$ molar ratio in the starting materials can be made to agree substantially with that in the final product. The $SiO_2/CaO$ molar ratio can generally be within the range of from 1 to 10, preferably from 1.5 to 8.

There is no critical condition in regard to the addition of the starting materials in the process of this invention. Generally, the water-soluble silicate and the calcium compound are mixed in the presence of an aqueous medium before reacting them hydrothermally. The mixing may be performed under heat, but usually, it is sufficient to perform the mixing at atmospheric pressure and room temperature. The water-soluble silicate and the calcium compound may be added simultaneously to the aqueous medium. Alternatively, the two components may be separately mixed with the aqueous medium, and the resulting dispersions, mixed with each other. A generally employed procedure comprises mixing the silicate compound and the calcium compound in an aqueous medium at room temperature and atmospheric pressure and treating the mixture at the reaction temperature described hereinabove; or separating the water-soluble components from the mixture by, or example, washing with water, and then reacting the residue.

The concentrations of the starting materials in the aqueous medium of the reaction system are not particularly limited. Generally, it is advantageous that the concentration of the water-soluble silicate is 2 to 14% by weight, preferably 3 to 10% by weight, and the concentration of the calcium compound is 2 to 14% by weight, preferably 3 to 10% by weight.

The addition and mixing of the starting materials can be performed successively in the same reaction apparatus. Or the starting materials may be pre-reacted at a temperature of from room temperature to the boiling point under atmospheric pressure, and then subjected to the hydrothermal treatment at elevated temperatures. In the latter case, it is possible to separate the water-soluble compounds (mainly by-product salt) after the preliminary reaction, re-adjust the ratio of the aqueous medium to calcium silicate, and subject the residue to the hydrothermal treatment at a high temperature. Generally, the formation of calcium silicate having a petal-like structure and a high specific bulk volume is performed under elevated pressures because the starting materials are treated at a temperature of as high as 150° C. or more. It is usual therefore to employ a pressure reactor such as an autoclave.

The resulting calcium silicate having a petal-like structure and a high specific bulk volume is separated from the solvent by filtration or the like in a nearly pure form. The resulting calcium silicate having a petal-like structure is dried by an ordinary method, and if desired, pulverized to obtain a final product.

In one particularly preferred embodiment of this invention, there is provided a process in which a water-soluble alkali metal silicate of the following rational formula $$M_2O \cdot nSiO_2 \cdot tm \quad (B)$$

wherein M is an alkali metal, and n is a number of 1.55 to 6.5, is used as the water-soluble silicate compound, and the calcium compound to be reacted with it is used in an amount of 1.05 to 1.4 equivalents, preferably 1.1 to 1.3 equivalents, per equivalent of the alkali ($M_2O$) moiety of the above alkali metal silicate.

This results in calcium silicate having a petal-like structure which has a higher specific bulk volume and a larger amount of oil absorption. It has specifically been found that by adding an excess of the calcium compound relative to the alkali moiety of the alkali metal silicate in the reaction of forming calcium silicate having a petal-like structure, the resulting calcium silicate has a far higher specific bulk volume and a larger amount of oil absorption than conventional ones.

In the above embodiment, calcium silicate is formed from the alkali metal silicate and the calcium compound in accordance with the following reaction scheme.

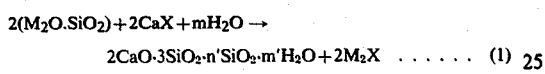

$$2(M_2O \cdot SiO_2) + 2CaX + mH_2O \rightarrow$$
$$2CaO \cdot 3SiO_2 \cdot n'SiO_2 \cdot m'H_2O + 2M_2X \quad \ldots \ldots \quad (1)$$

In the above scheme, M represents an alkali metal, especially Na or K, X represents a negative group such as $Cl_2$ or $(NO_3)_2$ which forms a salt with calcium, m represents a number larger than 0, and n represents a number of 1.55 to 6.5.

Figure 9:
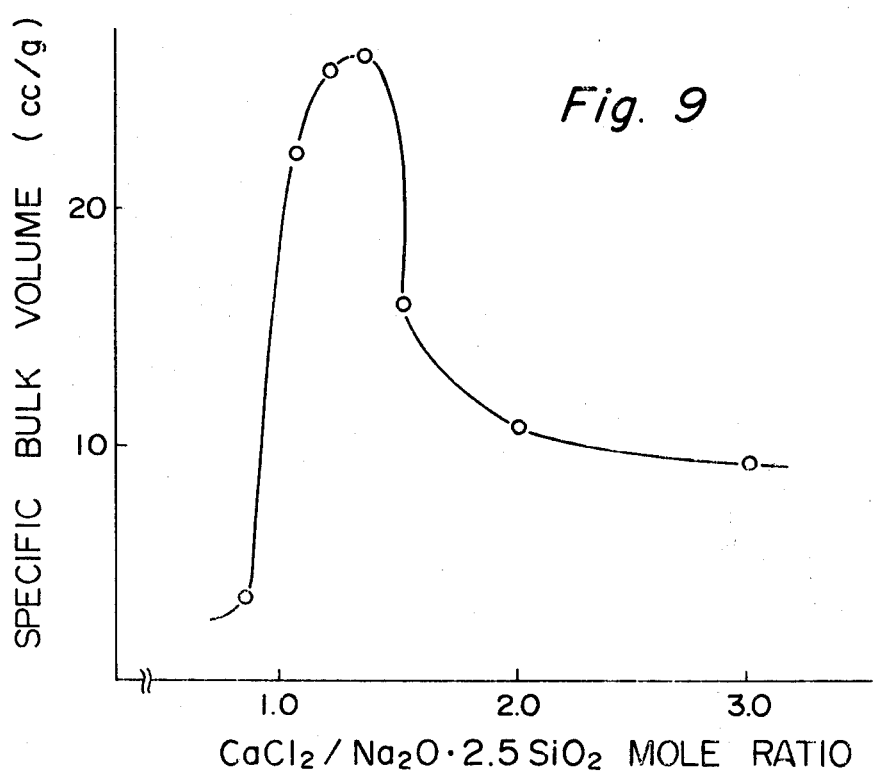
FIG. 9 is a plot of specific bulk volume versus the $CaCl_2/Na_2O.2.5\ SiO_2$ mole ratio.

Stoichiometrically, $M_2O$ and CaX react in a 1:1 equivalent ratio as can be seen from the reaction formula (1) above. Thus, it is generally not thought that any excess of either $M_2O$ or CaX would participate in the reaction and affect calcium silicate. The present inventors however found that the ratio between CaX and $M_2O$ in the alkali metal silicate greatly affects the properties, especially specific bulk volume and amount of oil absorption, of the resulting calcium silicate having a petal-like structure. The equivalent of the calcium compound to the $M_2O$ moiety of the alkali metal silicate $M_2O \cdot nSiO_2 \cdot mH_2O$ is referred to herein simply as the "$CaO/M_2O$ feed ratio". If this $CaO/M_2O$ feed ratio is less than 1.05 or more than 1.4, the specific bulk volume and amount of oil absorption of the resulting calcium silicate can be improved to a fairly larger extent. It has been found, however, that the specific bulk volume and amount of oil absorption of the resulting calcium silicate increase abruptly when the $CaO/M_2O$ feed ratio is within the range of from 1.05 to 1.4, and become maximum when this ratio is about 1.3. It has also been discovered that there is a definite relation between the $CaO/M_2O$ feed ratio and the specific bulk volume and amount of oil absorption of the resulting calcium silicate (see FIG. 9 of the accompanying drawings). It is desirable therefore to determine the $CaO/M_2O$ prior to the addition of the starting materials so that it will result in the desired specific bulk volume of the final product.

In using calcium silicate as a powder, its specific bulk volume and amount of oil absorption are very important factors. In recent years, there has been an increasing demand for inorganic powders having a very high specific bulk volume. But the specific bulk volume of inorganic powders is difficult to control in conventional processes, and such a control is scarcely performed. Moreover, there is a limit to the specific bulk volume of inorganic powders obtained by the conventional processes. The process of this invention therefore is a very great contribution to the industry since it can afford a calcium silicate powder of the desired high specific bulk volume not attainable by the conventional processes.

Generally, the calcium silicate having a petal-like structure obtained by this invention can be determined by the following procedure to correspond to the rational formula (A).

(i) The $SiO_2/CaO$ molar ratio is measured by a chemical analysis (JIS K3101).

(ii) The calcium silicate is subjected to an X-ray diffraction analysis to identify it as gyrolite-type calcium silicate.

(iii) Calcium silicate is heat-treated at 80° C. for 1 hour in a 0.5 N aqueous solution of sodium hydroxide to dissolve amorphous silicon dioxide. The amount of the amorphous silicon dioxide is determined by its quantitative chemical analysis (JIS K3101). By an X-ray diffraction analysis, the remaining calcium silicate can be identified as gyrolite-type calcium silicate.

The form of the calcium silicate of rational formula (A) can be ascertained by taking its electron microphotograph. Generally, its electron microphotograph (3,000 to 10,000×) clearly shows the shape of an assembly of many rose petals and the thicknesses of the petal-like flakes. The size and shape of the petals differ according to the types of the materials, the mixing ratio of the materials, and the manufacturing conditions, and cannot be definitely set. Generally, many of the petal-like flakes are circular or elliptical in shape with an average diameter of about 0.1 to 30 microns and a thickness of about 0.005 to 0.1 micron in the longitudinal direction. Particularly, many of the petal-like flakes resemble rose petals.

In the calcium silicate of the invention, the petal-like flakes in the assembly grow at random in many directions.

The calcium silicate of the invention described hereinabove is expressed by the rational formula $2CaO \cdot 3SiO_2 \cdot nSiO_2 \cdot mH_2O$. The $nSiO_2$ moiety of the formula is generally presumed to be amorphous, and is included in, and bonded to, the crystal structure of gyrolite-type calcium silicate $2CaO \cdot 3SiO_2 \cdot 2H_2O$, and can be chemically separated. However, the grain boundary between the amorphous silicon dioxide $nSiO_2$ moiety and the gyrolite-type calcium silicate [$2CaO \cdot 3SiO_2 \cdot 2H_2O$] moiety, and the form of bonding of these constituents, cannot be discerned even from a microphotograph (about 200,000×) of the calcium silicate taken by a scanning electron microscope. From these data, it can be presumed that the amorphous silicon dioxide moiety is dispersed very microscopically, for example as particles of 100 Å or less in size, and participates in the formation of a petal-like shape together with the gyrolite-type calcium silicate crystals.

The coefficient of water of crystallization in the above rational formula does not vary much according to the types of the starting materials and the reaction conditions, but is greatly affected by the conditions for drying and storing the resulting petal-like calcium silicate crystals. In this regard, the water of crystallization of the calcium silicate obtained by the invention resembles bonded water of silicon dioxide (hydrous silicic acid) obtained by a wet method.

Since in the calcium silicate of the invention, the petal-like flakes make up a porous structure, it generally has a high specific bulk volume and/or a very large amount of oil absorption.

The specific bulk volume and the amount of oil absorption as referred to herein are measured by the following methods.

A sample is prepared by pulverizing the calcium silicate so that 80% of it passes through a 200-mech sieve. The "specific bulk volume" of the sample is measured by the method of measuring bulk density set forth in paragraph 6.9 of JIS K6220. The "amount of oil absorption" of the sample is measured by the method of measuring the amount of oil absorption set forth in paragraph 19 of JIS K5101.

The specific bulk volume and the amount of oil absorption correlate with the size or thickness of the petals, and are generally affected by the types and amounts of the starting materials. In other words, the specific bulk volume and the amount of oil absorption vary depending upon the $SiO_2/CaO$ molar ratio in the resulting calcium silicate as well as upon the $CaO/M_2O$ feed ratio. For example, the specific bulk volume and the amount of oil absorption decrease when the $SiO_2/CaO$ mole ratio in the product is extremely low or high. Generally, a maximum value of the $SiO_2/CaO$ molar ratio exists within the range of 2.2 to 3.0. Thus, generally, both the specific bulk volume and the amount of oil absorption form a pyramidal configuration. However, when the $SiO_2/CaO$ molar ratio in the resulting calcium silicate becomes less than 1.55, the calcium silicate does not assume a complete petal-like structure, and tends to have a tobermorite or xonotolite crystal configuration. When the $SiO_2/CaO$ molar ratio increases extremely and exceeds 6.5, both the specific bulk volume and the amount of oil absorption decrease, and the intended petal-like calcium silicate crystals do not grow. It is generally advantageous to select the starting materials, the manufacturing conditions, etc. so that the $SiO_2/CaO$ molar ratio of the resulting calcium silicate will be from 1.55 to 4.0.

As will be clearly shown in Examples to be given hereinbelow, the petal-like calcium silicate obtained by this invention has a specific bulk volume of generally at least 4 cc/g, preferably at least 7 cc/g, more preferably at least 11 cc/g, and an amount of oil absorption of at least 2.0 cc/g, preferably at least 3.0 cc/g.

Another characteristic of the calcium silicate obtained by the present invention is that it can be easily pulverized. It can be fully pulverized by a simple device such as a kneader or mortar, and it is not particularly necessary to use a special pneumatic pulverizer such as Jet-O-Mizer (tradename) or Micron Mill (trademark), or a pulverizer including a ball mill or rod mill.

The calcium silicate obtained by the invention generally has a refractive index of from 1.54 to 1.46 although varying according to the $SiO_2/CaO$ molar ratio in the calcium silicate. Accordingly, when the calcium silicate is used in fields requiring specified refractive indices, for example as rubber fillers or resin fillers requiring transparency, the materials should be mixed so as to provide an $SiO_2/CaO$ molar ratio which will give the desired refractive index.

Because of the high specific bulk volume and the large amount of oil absorption, the calcium silicate in accordance with this invention can be widely used as various adsorbent carriers. Generally, hydrous silicic acid for adsorption and fixing of agricultural chemicals, alumina, silica and like carriers for supporting catalyst ingredients, and adsorbent carriers for filtration of impurities such as diatomaceous earth and activated carbon are known as adsorbent carriers. The calcium silicate in accordance with this invention can suitably replace these adsorbent carriers. Since the calcium silicate of the invention has a high specific bulk volume and a large amount of oil absorption, it exhibits especially superior effects when used as adsorbent carriers having active ingredients adsorbed and fixed thereto, or as filtration aids. Furthermore, because of its large amount of oil absorption and a high level of whiteness, it is also suitable as a paper-making filler, and a carrier for perfumes. When used as a delusterant in the field of paint, the calcium silicate of the invention exhibits a superior effect comparable to conventional finely divided silica. It also exhibits an effect equivalent to or greater than finely divided silica when used as a thickener.

According to another preferred embodiment of the invention, there is provided a process for producing calcium silicate or a calcium silicate-gypsum composite which comprises adding a water-soluble alkali metal silicate or its aqueous solution gradually to an aqueous suspension of gypsum, and hydrothermally treating the mixture at a temperature of 150° to 250° C., preferably 170° to 210° C., under an elevated pressure.

Depending upon the proportions of the starting materials, the reaction conditions, etc., calcium silicate or a calcium silicate-gypsum composite in the form of an assembly of rose petal-like flakes can be obtained by this embodiment.

It is important in this embodiment that the water-soluble alkali metal silicate or its aqueous solution should be added to the suspension of gypsum, and the addition should be performed as slowly as possible. When under these conditions, the gypsum/alkali metal silicate molar ratio is about 1, petal-like calcium silicate is mainly formed. When the molar ratio is from 1.1 to 1.5, a petal-like calcium silicate/gypsum composite is obtained mainly.

A suitable alkali metal silicate used as one starting material in the above embodiment is expressed by the following rational formula $$R_2O.lSiO_2$$

wherein R is sodium or potassium, and l is a number of 1.55 to 6.5. The amounts of the gypsum and the alkali metal silicate are advantageously such that the gypsum/alkali metal silicate molar ratio is within the range of from 1.0 to 1.5.

In the above embodiment, gypsum is first put into water, and the mixture is well stirred to make a slurry. The concentration of gypsum in the slurry is preferably low. However, if it is too low and water is added in an amount of more than 100 times the weight of the finally obtained calcium silicate, the resulting calcium silicate cannot assume a petal-like structure. A water-soluble alkali metal silicate such as sodium silicate or potassium silicate or its aqueous solution is gradually added to the slurry generally under atmospheric pressure to form a slurry. The time required for the addition should be as long as possible. The time is not definitely limited by the particle size and crystal form of gypsum. Generally, it is at least 10 minutes, and gypsum should be added over as long a time as possible.

If the time during which the alkali metal silicate is added is too short, it is difficult to form petal-like calcium silicate or a petal-like calcium silicate/gypsum composite having a high specific bulk volume, and the product tends to become a mass.

The order of addition of the starting materials in the above embodiment is also important. If the order is reversed, it is difficult to form petal-like calcium silicate. In other words, when the gypsum slurry is added to the alkali metal silicate or its aqueous solution, most of the resulting calcium silicate crystals do not assume a petal-like form, but tend to become a mass even if the rate of addition is very slow.

The resulting mixture of the gypsum slurry and the alkali metal silicate is then reacted at 150° to 250° C. under an elevated pressure using an autoclave or the like to afford the desired calcium silicate or calcium silicate/gypsum composite.

When it is desired to obtain calcium silicate in this embodiment, the gypsum/alkali metal silicate molar ratio is adjusted to about 1, and when a calcium silicate/gypsum composite is desired, the molar ratio is adjusted to a range of from 1.1 to 1.5.

From the chemical reaction equation, those skilled in the art would not think that when the molar ratio is more than 1, the excess of gypsum will participate in the reaction. It has been found surprisingly that the excess of gypsum is not present merely as an impurity in the resulting calcium silicate, but is microblended in calcium silicate to form a calcium silicate-gypsum composite, and the calcium silicate and gypsum cannot be differentiated even by an electron microscope of $10,000\times$, and that the resulting composite has a very high specific bulk volume and a large amount of oil absorption. The mechanism of such a phenomenon is not clear. From the fact that when calcium silicate is first synthesized, then gypsum is added and the mixture is hydrothermally treated in an autoclave, such a composite cannot be obtained, it is presumed that gypsum participates in some way or other in the crystal growth of calcium silicate. On the other hand, when the above calcium silicate/gypsum mole ratio exceeds 1.6, gypsum can be diffrentiated from calcium silicate in the resulting product when viewed by a microscope.

The calcium silicate/gypsum composite exhibits superior performance equal to the aforesaid petal-like calcium silicate having a high specific bulk volume when used as adsorbent carriers, delusterants and filtration aids.

The following Examples and Comparative Examples illustrate the present invention in greater detail. The various measured values in these examples were determined by the following methods.

(A) Specific Bulk Volume

Calcium silicate is pulverized in a mortar to such a size that 80% of it passes through a 200-mesh sieve. The specific bulk volume of the pulverized calcium silicate is measured in accordance with the method for measuring bulk density set forth in Paragraph 6.9 of JIS K6220.

(B) Amount of Oil Absorption

Calcium silicate is pulverized in a mortar to such a size that 80% of it passes through a 200-mesh sieve. The amount of oil absorption of the pulverized calcium silicate is measured by the method of measuring the amount of oil absorption set forth in Paragraph 19 of JIS K5101.

(C) Refractive Index

A solvent is prepared by mixing $\alpha$-chloronaphthalene and cyclohexane. Using this solvent, the refractive index of calcium silicate is measured by a dipping method. The dipping method is performed in accordance with the procedure set forth in Toshio Sudo, "Clary Mineralogy" (a Japanese-language publication), pp. 100–103 (1974).

(D) 60° Gloss

Calcium silicate is pulverized by using an ultrafine pulverizer (Jet-O-Mizer, a trademark for a product of Fluid Energy Corporation), and classified to form a powder having an average particle diameter (Stoke's diameter) of 4 microns measured by a sedimentation balance. The powder (1 g) is dispersed in a paint (100 ml), and the dispersion is coated on a glass plate to a thickness of 75 microns. The 60° mirror surface gloss of the coating is measured by the method set forth in JIS K5400.

(E) X-ray Diffraction

By Rotaflex pl 200 (a trademark for a product of Rigaku Denki Kabushiki Kaisha), X-ray diffraction of calcium silicate is determined using CuK$\alpha$.

EXAMPLE 1

Figure 2:
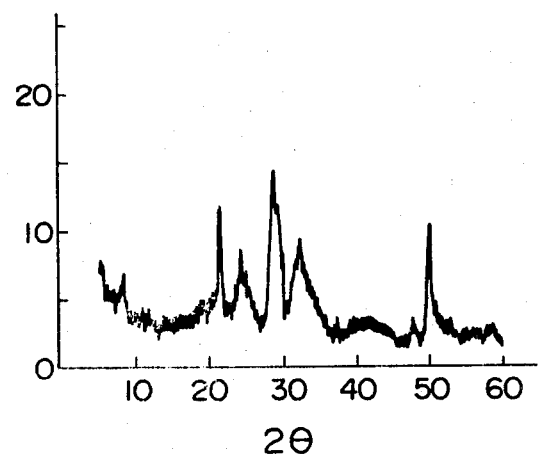
FIG. 2 is the X-ray diffraction pattern of pure gyrolite-type calcium silicate.

A 0.3144 mole/l aqueous solution (100 cc) of calcium chloride and a 0.3144 mole/l aqueous solution (100 cc) of sodium silicate ($SiO_2/Na_2O$ ratio=2.6) were mixed at 25° C. under atmospheric pressure (the feed $SiO_2$/CaO molar ratio 2.6). Simultaneously with the mixing, a white precipitate formed, but the mixture was placed in an autoclave and reacted at 200° C. for 5 hours in a sealed condition. The pressure at this time was 14 kg/cm$^2$. G, and the water ratio was 30. The reaction mixture was filtered, washed twice with 100 cc of deionized water, and dried at 100° C. for 8 hours. The yield of this dried product was 7.35 g. The dried product did not shrink nor solidify during the drying, but remained soft and could be powdered easily. The product had a specific bulk volume of 20.5 cc/g, an amount of oil absorption of 6.21 cc/g, and a refractive index of 1.50. The X-ray diffraction pattern ($2\theta=4.6$–60°) of the resulting calcium silicate was as shown in FIG. 1. FIG. 2 shows the X-ray diffraction pattern ($2\theta=4.6$–60°) of pure gyrolite-type calcium silicate.

This gyrolite-type calcium silicate was obtained in Comparative Example 1 to be given hereinbelow by feeding an aqueous solution of calcium chloride and an aqueous solution of sodium silicate so that the $SiO_2$/CaO molar ratio became 1.5, reacting them at 200° C. for 5 hours, washing the reaction mixture twice with 100 cc of deionized water, and drying the product at 100° C. for 8 hours.

When compared with the chart in FIG. 1 of Journal of Physical Chemistry, 60, pp. 397–404 (1956), the above two X-ray diffraction charts are those of gyrolite-type calcium silicate.

The resulting calcium silicate was analyzed in accordance with JIS R3101, and the results were as follows: Ca 24.4%, $SiO_2$ 66.1%, ignition loss 9.5%.

Figure 3:
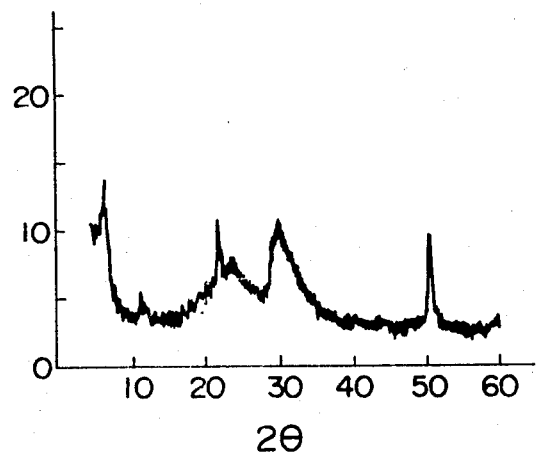
FIG. 3 is an X-ray diffraction pattern of a calcium silicate of the invention.

One gram of the calcium silicate was heat-treated at 80° C. for 1 hour in a 0.5 N aqueous solution of sodium hydroxide. The insoluble matter was separated, dried, and submitted to X-ray diffraction analysis ($2\theta=4.6$–60°). The X-ray diffraction pattern obtained is shown in FIG. 3. FIG. 3 is identical with FIG. 2, and thus, this leads to the confirmation that the insoluble matter is gyrolite-type calcium silicate.

The solution left after the separation of the insoluble matter was subjected to chemical quantitative analysis in accordance with JIS R3101. It was found that the solution contained 0.269 g of $SiO_2$.

These results show that the calcium silicate obtained had the general formula $2CaO.3SiO_2.2.05SiO_2.2.43H_2O$.

The calcium silicate obtained was subjected to a Hunter whiteness test in accordance with JIS P8123. Its degree of whiteness was found to be 98.

The calcium silicate obtained was photographed on a scale of 3,000× and 10,000× respectively by using an electron microscope (JSM-50A, a trademark for a product of Nippon Denshi Co., Ltd.). The microphotographs obtained are shown in FIG. 4-A and FIG. 4-B, from which it is clear that the calcium silicate obtained is made up of an assembly of petal-like flakes having an average diameter of about 2 microns in the longitudinal direction and a thickness of less than 0.1 micron.

COMPARATIVE EXAMPLE 1

A 0.5 mole/l aqueous solution (50 cc) of calcium chloride and a 0.5 mole/l aqueous solution (50 cc) of sodium silicate ($SiO_2/Na_2O$ ratio=1.5) were mixed, and the mixture was reacted in an autoclave at 200° C. for 5 hours. The reaction mixture was treated and dried in the same way as in Example 1 to afford dried calcium silicate having a specific bulk volume of 4.2 cc/g and an amount of oil absorption of 1.8 cc/g which were far lower than the calcium silicate obtained in Example 1.

This calcium silicate was photographed on a scale of 3,000× and 10,000× by an electron microscope. The resulting microphotographs are shown in FIGS. 5-A and 5-B which show that the calcium silicate was made up of a laminate of plate-like flakes which are quite different in shape from the calcium silicate shown in FIGS. 4-A and 4-B.

EXAMPLE 2

Slaked lime (0.74 g) was mixed with 50 cc of a 0.2 mole/l aqueous solution of sodium silicate ($SiO_2/Na_2O$ ratio=2.6), and the mixture was stirred at 20° C. for 5 minutes under atmospheric pressure. The mixture was neutralized with 20 cc of 1N sulfuric acid, and reacted at 200° C. for 5 hours in an autoclave. The reaction mixture was treated and dried in the same way as in Example 1. The reaction product had a specific bulk volume of 4.2 cc/g, and its electron microphotograph (10,000×) was as shown in FIG. 6. It is seen from FIG. 6 that the product was an assembly of petal-like flakes having a diameter of about 1 micron in the longitudinal direction. Chemical analysis of this product showed that the product is expressed by the formula $2CaO.3SiO_2.2.05SiO_2.2.35H_2O$.

EXAMPLE 3

The procedure of Example 1 was repeated except that the ratio of the starting materials, the concentrations of the starting materials, the water ratio [$H_2O/(CaO+SiO_2)$], and the other reaction conditions were changed as shown in Table 1. The results are shown in Table 1. The n and m values of $nSiO_2.mH_2O$ in Table 1 were those of amorphous silicon dioxide contained in calcium silicate of the general formula $2CaO.3SiO_2.nSiO_2.mH_2O$ which were measured in the same way as in Example 1.

Table 1

| | Run No. | 1 | 2 | 3 | 4 | 5 | 6 | 7 | 8 |
|---|---|---|---|---|---|---|---|---|---|
| Conditions | Concentration of $CaCl_2$ (mole/l) | 0.4065 | 0.3546 | 0.3144 | 0.2824 | 0.1572 | 0.2358 | 0.2358 | 0.2252 |
| | Concentration of sodium silicate (mole/l) | 0.4065 | 0.3546 | 0.3144 | 0.2824 | 0.1572 | 0.2358 | 0.2358 | 0.2252 |
| | $SiO_2/Na_2O$ ratio in sodium silicate | 1.8 | 2.2 | 2.6 | 3.0 | 2.6 | 2.6 | 2.6 | 4.0 |
| | Feed $SiO_2/CaO$ molar ratio | 1.8 | 2.2 | 2.6 | 3.0 | 2.6 | 2.6 | 2.6 | 4.0 |
| | Water ratio [$H_2O/(CaO+SiO_2)$] at the time of feeding | 30 | 30 | 30 | 30 | 60 | 40 | 40 | 30 |
| | Temperature (°C.) of autoclave | 200 | 200 | 200 | 200 | 200 | 180 | 220 | 200 |
| | Pressure (kg/cm$^2$ . G) of autoclave | 14 | 14 | 14 | 14 | 14 | 9 | 23 | 14 |
| | Time of treatment in autoclave (hours) | 5 | 5 | 5 | 5 | 5 | 20 | 5 | 5 |
| Results | Specific bulk volume (cc/g) | 14.4 | 17.0 | 20.5 | 14.4 | 19.5 | 17.3 | 11.2 | 10.3 |
| | Amount of oil absorption (cc/g) | 5.06 | 5.64 | 6.21 | 5.42 | 6.03 | 5.56 | 4.15 | 3.90 |
| | Refractive index | 1.53 | 1.51 | 1.50 | 1.49 | 1.50 | 1.50 | 1.50 | 1.48 |
| | n in $nSiO_2 . mH_2O$ | 0.48 | 1.27 | 2.05 | 2.83 | 1.89 | 2.00 | 2.00 | 4.81 |
| | m in $nSiO_2 . mH_2O$ | 2.08 | 2.22 | 2.33 | 2.54 | 2.34 | 2.40 | 2.34 | 2.77 |

EXAMPLE 4

The procedure of Example 1 was repeated except that calcium nitrate was used instead of the calcium chloride. The resulting calcium silicate had a specific bulk volume of 21.2 cc/g, an amount of oil absorption of 6.24 cc/g and a refractive index of 1.50. An electron microphotograph of this calcium silicate showed, as in Example 1, that it was an assembly of petal-like flakes having a diameter of about 2 microns in the longitudinal direction. X-ray diffraction analysis and chemical analysis of the calcium silicate showed that it has the formula $2CaO.3SiO_2.2.06SiO_2.2.37H_2O$.

EXAMPLE 5

In Example 1, the white precipitate formed after the mixing of the starting materials was separated, and washed twice with water to remove sodium chloride. Then, deionized water was added so that the water ratio [$(H_2O/(CaO+SiO_2)$] became 30, and the treatment was performed in the same way as in Example 1 in an autoclave. The resulting calcium silicate had a specific bulk volume of 17.2 cc/g, an amount of oil absorption of 5.62 cc/g, and a refractive index of 1.50. An electron microphotograph of this calcium silicate was substantially the same as that of the calcium silicate obtained in Example 1. The calcium silicate was found to have the formula $2CaO.3SiO_2.2.05SiO_2.2.35H_2O$.

EXAMPLE 6

The same procedure as in Example 1 was performed except that potassium silicate was used instead of the sodium silicate. The resulting calcium silicate had a specific bulk volume of 19.5 cc/g, an amount of oil absorption of 5.95 cc/g and a refractive index of 1.50. It was seen from an electron microphotograph of the product that it was an assembly of pedal-like flakes almost the same as those in Example 1. Chemical analysis showed that this sodium silicate has the formula $2CaO.3SiO_2.2.05SiO_2.2.37H_2O$.

COMPARATIVE EXAMPLE 2

A 35% by weight aqueous solution (100 cc) of calcium chloride and 200 g of a 53.4% by weight aqueous solution of sodium silicate ($SiO_2/Na_2O$ ratio=2.5) were mixed so that the water ratio became 2.5. The slurry was treated in an autoclave in the same way as in Example 1. The resulting calcium silicate was not pedal-like in shape as a result of taking its electron microphotography. Its specific bulk volume was only 3.9 cc/g.

COMPARATIVE EXAMPLE 3

A 0.05 mole/l aqueous solution (50 cc) of calcium chloride and 50 cc of a 0.05 mole/l aqueous solution of sodium silicate ($SiO_2/Na_2O$ ratio=2.5) were mixed so that the water ratio was 388, and the mixture was treated in the same way as in Example 1. The feed $SiO_2/CaO$ molar ratio was 2.5, but the $SiO_2/CaO$ molar ratio in the resulting calcium silicate was found to be 1.5 as a result of chemical analysis. X-ray diffraction analysis led to the confirmation that this product is gyrolite-type calcium silicate. From its chemical analysis, it is clear that the product did not contain amorphous silicon dioxide. The electron microphotograph of the product showed that it did not assume a petal-like configuration.

COMPARATIVE EXAMPLE 4

The procedure of Example 1 was repeated except that the treatment in the autoclave was carried out at 120° C. for 20 hours, or at 300° C. for 20 hours.

In either case, gyrolite-type calcium silicate was not formed, and the product was not an assembly of petal-like flakes as is seen from their electron microphotographs. The specific bulk volume of the products were 4.5 cc/g and 4.8 cc/g, respectively.

EXAMPLE 7

Petal-like calcium silicate powder obtained in the same way as in Example 1 was pulverized to an average particle diameter of 4 microns by an air pulverizer (Jet-O-Mizer, a trademark). The powder obtained was mixed with each of the paints shown in Table 2, and the 60° gloss values of the resulting coatings were measured. The results are shown in Table 2 from which it is seen that the calcium silicate of the invention exhibits a delustering effect.

Table 2

| No. | Type of paint | Amount (g) | 60° Gloss |
|---|---|---|---|
| 1 | Lacquer Clear | 1.0 | 19.5 |
| 2 | Urethane Clear | 5.0 | 12.6 |
| 3 | Amilac Clear | 5.0 | 14.4 |
| 4 | Aminoalkyd | 3.0 | 16.4 |

EXAMPLE 8

Petal-like calcium silicate obtained in the same way as in Example 1 was pulverized by a micron mill to such a size that 20% of it passed through a 325-mesh sieve. The pulverized calcium silicate (1 g) was added to 200 cc of a 1% aqueous solution of magnesium hydroxide, and the filtration time on a Buchner funnel with a diameter of 7 cm was measured and found to be 6 minutes and 48 seconds.

For comparison, the filtration time in the absence of calcium silicate was 21 minutes and 48 seconds. When commercially available Radiolite #700 (trademark) was added in an amount of 1 g as a filtration aid, the filtration time was 15 minutes and 12 seconds. From the results obtained, it is seen that the calcium silicate of the invention also has a marked effect as a filtration aid.

EXAMPLE 9

The calcium silicate powder obtained in Example 1 was put into a ribbon mixer, and while rotating the ribbon mixer, commercially available agricultural chemical BPMC (2-sec-butyl phenyl-N-methyl carbamate) was added dropwise in an amount 3 times the weight of the calcium silicate. In this way, they were mixed with each other. A dust containing the BPMC was obtained which did not contain solid masses having a size larger than 20 mesh.

EXAMPLES 10 to 15

Aqueous solutions (each 100 cc) of calcium chloride having three different concentrations as shown in Table 3 were prepared. Each of the aqueous solutions was mixed with 100 cc of a 0.3144 mole/l aqueous solution of sodium silicate ($SiO_2/Na_2O$ ratio=2.6) at atmospheric pressure and 25° C. The feed $SiO_2/CaO$ molar ratios were as shown in Table 3. In each run, a white precipitate formed as soon as the mixing was performed, but the mixture was directly placed in an autoclave and reacted in a sealed condition at 200° C. for 5 hours. The pressure at this time was 14 kg/cm².G. The water/calcium silicate ratio was 30. The reactive mixture was filtered, washed twice with 100 cc of deionized water, and dried at 100° C. for 8 hours. The yield of the dried product was as shown in Table 3. The product did not shrink nor solidify during the drying, but remained soft and could be easily powdered. The specific bulk volumes and amounts of oil absorption of the products were as shown in Table 3.

The resulting calcium silicate was analyzed in accordance with JIS R3101 for CaO and $SiO_2$ contents (%) and ignition loss (%). Furthermore, 1 g of calcium silicate was heat-treated at 80° C. for 1 hour in a 0.5 N aqueous solution of sodium hydroxide, and then insoluble substances were separated. The remaining solution was subjected to a chemical quantitative analysis in accordance with JIS R3101 to determine the content (g) of $SiO_2$ contained in the solution. The results are shown in Table 3.

From the results obtained, it was found that the calcium silicates obtained in Examples 10, 11 and 12 have the general formulae $2CaO.3SiO_2.2.05SiO_2.2.33H_2O$, $2CaO.3SiO_2.2.06SiO_2.2.34H_2O$, and $2CaO.3SiO_2.2.05SiO_2.2.34H_2O$, respectively.

When all the starting materials were converted to gyrolite-type calcium silicate and amorphous silicon dioxide, the resulting products in Examples 10 to 12 can be theoretically expressed by the general formula $2CaO.3SiO_2.2.2SiO_2.2.4H_2O$.

The calcium silicate obtained in Example 11 was observed by an electron microscope (JSM-50A, a trademark for a product of Nippon Denshi Kabushiki Kaisha) on a scale of 10,000×. The microphotograph taken of this calcium silicate is shown in FIG. 7. It was confirmed that the calcium silicate products in the other Examples were also made up of an assembly of petal-like flakes having an average diameter of about 2 microns in the longitudinal direction and a thickness of not more than about 1 micron.

Figure 8:
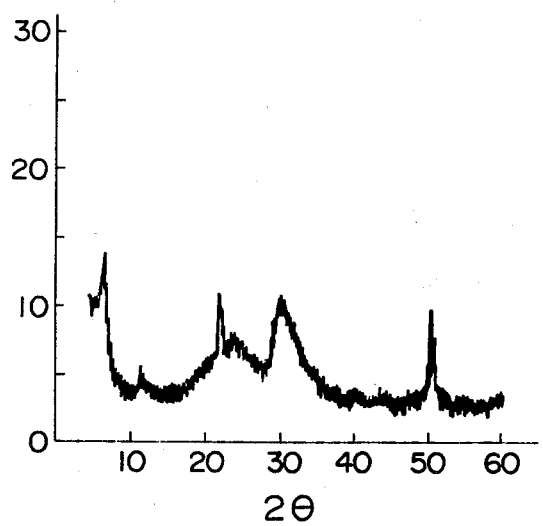
FIG. 8 is an X-ray diffraction pattern of the product of Example 12.

The resulting calcium silicates were subjected to X-ray diffraction analysis ($2\theta = 4.6°-60°$). The X-ray diffraction pattern of the product obtained in Example 12 is shown in FIG. 8. The other products showed quite the same pattern.

The above procedure was repeated except that the concentration of the aqueous calcium chloride solution (100 cc) was changed to the three different values (Examples 13, 14 and 15) shown in Table 3. The specific bulk volumes and amounts of oil absorption of the resulting calcium silicate products were as shown in Table 3. The specific bulk volumes of the calcium silicates obtained in Examples 10 to 15 were plotted on the axis of ordinates, and the $CaO/R_2O$ feed ratios of these, on the axis of abscissas in FIG. 9. It is clearly seen from FIG. 9 too that the specific bulk volume of calcium silicate abruptly increases when the $CaO/R_2O$ feed ratio is within the range of from 1.05 to 1.4.

of sodium silicate ($SiO_2/Na_2O$ mole ratio=1.8) was used and each of the three different aqueous solutions of calcium chloride shown in Table 4 was used.

It was confirmed that the resulting calcium silicate products were made up of an assembly of petal-like flakes as in Examples 10 to 12. The products in Examples 16 to 18 were chemically analyzed, and were found to be expressed by the general formulae $2CaO.3SiO_2 0.48SiO_2.2.08H_2O$, $2CaO.3SiO_2.0.48SiO_2.2.07H_2O$, and $2CaO.3SiO_2.0.49SiO_2.2.08H_2O$, respectively. The X-ray diffraction patterns of the products in Examples 16 to 18 were the same as that of the product obtained in Example 12. The specific bulk volumes and amounts of oil absorption of the calcium silicate products were as shown in Table 4.

The same procedure as above was repeated except that aqueous calcium chloride solutions of different concentrations as shown in Table 4 were used.

The specific bulk volumes and amounts of oil absorption of the calcium silicate products were as shown in Table 4.

From these results, it is seen that the specific bulk volume and the amount of oil absorption of calcium silicate both increase abruptly when the $CaO/Na_2O$ feed ratio is in the range of from 1.05 to 1.4.

Table 4

| Example | 16 | 17 | 18 | 19 | 20 | 21 |
|---|---|---|---|---|---|---|
| Concentration of the fed aqueous calcium chloride solution (mole/l) | 0.4268 | 0.4878 | 0.5488 | 0.3455 | 0.6098 | 0.8130 |
| CaO/Na$_2$O molar ratio | 1.05 | 1.2 | 1.35 | 0.85 | 1.5 | 2.0 |
| Specific bulk volume (cc/g) | 16.1 | 18.5 | 19.2 | 3.1 | 11.2 | 8.1 |
| Amount of oil absorption (cc/g) | 4.5 | 5.2 | 5.5 | 1.1 | 3.6 | 2.9 |

EXAMPLES 22 to 27

The procedure of Examples 10 to 12 was repeated except that 100 cc of a 0.2824 mole/l aqueous solution of sodium silicate ($SiO_2/Na_2O$ molar ratio=3.0) was Table 3

| | Example | 10 | 11 | 12 | 13 | 14 | 15 |
|---|---|---|---|---|---|---|---|
| | Concentration of the fed aqueous calcium chloride solution (mole/l) | 0.3301 | 0.3773 | 0.4244 | 0.2672 | 0.4716 | 0.6288 |
| | CaO/Na$_2$O molar ratio | 1.05 | 1.2 | 1.35 | 0.85 | 1.5 | 2.0 |
| Properties of calcium silicate | Specific bulk volume (cc/g) | 22.7 | 25.9 | 26.7 | 3.6 | 16.0 | 10.7 |
| | Amounts of oil absorption (cc/g) | 6.3 | 7.3 | 7.7 | 1.3 | 4.4 | 3.3 |
| | CaO (%) | 24.4 | 24.4 | 24.5 | — | — | — |
| | SiO$_2$ (%) | 66.1 | 66.3 | 66.3 | — | — | — |
| | Ignition loss (%) | 9.5 | 9.3 | 9.2 | — | — | — |
| | SiO$_2$ (%) in the solution left after separation of insoluble substances | 26.9 | 27.0 | 26.8 | — | — | — |

EXAMPLES 16 to 21

The procedure of Examples 10 to 12 was repeated except that 100 cc of a 0.4065 mole/l aqueous solution used, and each of the different aqueous calcium chloride solutions shown in Table 5 was used. It was confirmed that the resulting calcium chloride products were made up of an assembly of petal-like flakes same as in Examples 10 to 12. The same chemical analysis as in Examples 10 to 12 showed that the products obtained in Examples 22, 23 and 24 are expressed by the general formulae $2CaO.3SiO_2.2.83SiO_2.2.54H_2O$, $2CaO.3SiO_2.2.83SiO_2.2.54H_2O$, and $2CaO.3SiO_2.2.84SiO_2.2.55H_2O$, respectively. The X-ray diffraction patterns of the products obtained in Examples 22 to 24 were the same as that of the product obtained in Example 12. The specific bulk volumes and amounts of oil absorption of the calcium silicate products were as shown in Table 5 below.

The above procedure was repeated except that each of the aqueous calcium chloride solutions as shown in Table 5 was used. The specific bulk volumes and amounts of oil absorption of the calcium silicate products obtained were as shown in Table 5. It is clearly seen from these results that the specific bulk volume and the amount of oil absorption increase abruptly when the $CaO/Na_2O$ feed ratio is within the range of from 1.05 to 1.4.

The above procedure was repeated except that each of the aqueous calcium nitrate solutions (Examples 31 to 33) shown in Table 6 were used.

The specific bulk volumes and the amounts of oil absorption of the resulting calcium silicate products were as shown in Table 6. It is seen from these results that both the specific bulk volume and the amount of oil absorption of calcium silicate increase abruptly when the $Ca/Na_2O$ feed ratio is within the range of from 1.05 to 1.4.

Table 6

| Example | 28 | 29 | 30 | 31 | 32 | 33 |
|---|---|---|---|---|---|---|
| Concentration of the fed aqueous calcium nitrate solution (mole/l) | 0.3301 | 0.3773 | 0.4244 | 0.2672 | 0.4716 | 0.6288 |
| $CaO/Na_2O$ molar ratio | 1.05 | 1.2 | 1.35 | 0.85 | 1.5 | 2.0 |
| Specific bulk volume (cc/g) | 25.1 | 27.6 | 30.1 | 3.7 | 18.2 | 12.1 |
| Amount of oil absorption (cc/g) | 6.8 | 8.1 | 8.4 | 1.3 | 5.6 | 3.9 |

EXAMPLES 34 to 39

The procedure of Examples 10 to 12 was repeated except that 100 cc of a 0.3144 mole/l of potassium silicate ($SiO_2/K_2O$ molar ratio=2.6) was used instead of the aqueous sodium silicate solution, and each of the three aqueous calcium chloride solutions was used. It was confirmed that the resulting calcium silicate products were composed of an assembly of petal-like flakes same as in Examples 10 to 12.

Table 5

| Example | 22 | 23 | 24 | 25 | 26 | 27 |
|---|---|---|---|---|---|---|
| Concentration of the fed calcium chloride solution (mole/l) | 0.2965 | 0.3389 | 0.3812 | 0.2400 | 0.4236 | 0.5648 |
| $CaO/Na_2O$ molar ratio | 1.05 | 1.2 | 1.33 | 0.85 | 1.5 | 2.0 |
| Specific bulk volume (cc/g) | 16.7 | 19.4 | 20.3 | 3.2 | 12.1 | 8.6 |
| Amount of oil absorption (cc/g) | 4.8 | 5.6 | 6.1 | 1.2 | 4.1 | 3.3 |

EXAMPLES 28 to 33

The procedure of Examples 10 to 12 was repeated except that each of the three different aqueous calcium nitrate solutions shown in Table 6 below was used instead of the aqueous calcium chloride solution used in Examples 10 to 12.

It was confirmed that the resulting calcium silicate products were composed of an assembly of petal-like flakes same as in Examples 10 to 12. The same chemical analysis as in Examples 10 to 12 showed that the products obtained in Examples 28, 29 and 30 are expressed by the general formulae $2CaO.3SiO_2.2.05SiO_2.2.33H_2O$, $2CaO.3SiO_2.2.05SiO_2.2.35H_2O$, and $2CaO.3SiO_2.2.06SiO_2.2.34H_2O$, respectively. The X-ray diffraction patterns of the products obtained in Examples 28 to 30 were the same as that of the product obtained in Example 12. The specific bulk volumes and the amounts of oil absorption of the products were as shown in Table 6.

The same chemical analysis as in Examples 10 to 12 showed that the products obtained in Examples 34, 35 and 36 are represented by the general formulae $2CaO.3SiO_2.2.06SiO_2.2.34H_2O$, $2CaO.3SiO_2.2.05SiO_2.3.32H_2O$ and $2CaO.3SiO_2.2.05SiO_2.3.34H_2O$. The X-ray diffraction patterns of the products obtained in Examples 34, 35 and 36 were the same as that of the product obtained in Example 12. The specific bulk volumes and the amounts of oil absorption of the calcium silicate product were as shown in Table 7.

The same procedure as above was repeated except that each of the aqueous calcium chloride solutions as shown in Table 7 was used.

The specific bulk volumes and the amounts of oil absorption of the resulting calcium silicate products were as shown in Table 7. It is clearly seen from these results that the specific bulk volume and the amount of oil absorption of calcium silicate increase abruptly when the $CaO/K_2O$ feed ratio is within the range of from 1.05 to 1.4.

Table 7

| Example | 34 | 35 | 36 | 37 | 38 | 39 |
|---|---|---|---|---|---|---|
| Concentration of the fed calcium chloride solution (mole/l) | 0.3301 | 0.3773 | 0.4244 | 0.2672 | 0.4716 | 0.6288 |
| CaO/K$_2$O molar ratio | 1.05 | 1.20 | 1.35 | 0.85 | 1.50 | 2.00 |
| Specific bulk volume (cc/g) | 2.04 | 23.6 | 24.3 | 3.2 | 14.8 | 9.5 |
| Amount of oil absorption (cc/g) | 6.1 | 6.6 | 6.9 | 1.0 | 4.3 | 3.1 |

EXAMPLE 40

4.56 g of β-type calcium sulfate hemihydrate (all 100-mesh under) was put into 98 cc of water, and the mixture was stirred for 20 minutes. While stirring this slurry, 100 cc of a 0.3144 mole/l aqueous solution of sodium silicate (SiO$_2$/Na$_2$O molar ratio=2.6) was added at a rate of 5 cc/min. over the course of 20 minutes at 25° C. under atmospheric pressure. The feed CaSO$_4$/Na$_2$O.nSiO$_2$ molar ratio at this time was 1.00. The resulting slurry was placed in an autoclave, and reacted at 200° C. for 5 hours in a sealed condition. The reaction mixture was filtered, washed twice with 100 cc of deionized water, and dried at 100° C. for 8 hours. The yield of the dried product was 7.35 g. The resulting product had a specific bulk volume of 21 cc/g and an amount of oil absorption of 6.3 cc/g. An X-ray diffraction analysis of the product showed that it has a pattern of gyrolite-type calcium silicate. Chemical analysis showed that it contained 24.4% of CaO, and 66.2% of SiO$_2$, and its ignition loss was 9.4%.

Figure 10:
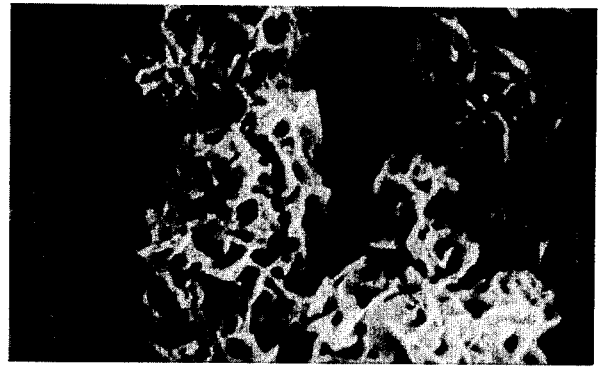
FIGS. 10 and 11 are electron microphotographs of a calcium silicate of the invention.

It was ascertain from these results that calcium silicate obtained by the above operation is expressed by the formula 2CaO.3SiO$_2$.2.06SiO$_2$.2.39H$_2$O. An electron microphotograph of this product on a scale of 10,000× is shown in FIG. 10. It was confirmed from this photograph that this product was made up of an assembly of petal-like flakes having an average diameter of about 2 microns in the longitudinal direction and a thickness of less than 0.1 micron.

EXAMPLE 41

Figure 11:

6.5 of calcium sulfate dihydrate (all 100-mesh under) was put into 98 cc of water, and the mixture was stirred for 20 minutes. While stirring this slurry, 100 cc of a 0.3144 mole/l aqueous solution of sodium silicate (SiO$_2$/Na$_2$O molar ratio=2.6) was added over the course of 16 minutes and 40 seconds at 25° C. under atmospheric pressure. The CaSO$_4$/Na$_2$O.nSiO$_2$ feed ratio was 1.34. Subsequently, the same operation as in Example 40 was performed to afford 8.2 g of a powder. An X-ray diffraction pattern of this powder included peaks of II-type anhydrous gypsum and gyrolite-type calcium silicate. Its chemical analysis showed that the product was (2CaO.3SiO$_2$.2.05SiO$_2$.2.37H$_2$O)(0.20CaSO$_4$). An electron microphotograph of the product on a scale of 10,000× is shown in FIG. 11. It was confirmed from this photograph that the product was made up of petal-like flakes having a diameter of 2 microns in the longitudinal direction and a thickness of less than 0.1 micron.

Crystals of II-type anhydrous gypsum was not discerned. The product had a specific bulk volume of 19.5 cc/g and an amount of oil absorption of 6.32 cc/g.

EXAMPLE 42

The procedure of Example 40 was repeated except that the amount of the β-type calcium sulfate hemihydrate, the SiO$_2$/CaO molar ratio of sodium silicate, the concentration of sodium silicate, and the reaction temperature and time in the autoclave were changed as shown in Table 8. The CaSO$_4$/Na$_2$O.nSiO$_2$ feed ratio was 1.00. In all runs, it was confirmed by X-ray diffraction, electron microscopic examination and chemical analysis that the product was petal-like calcium silicate. The results are shown in Table 8.

Table 8

| Run No. | 1 | 2 | 3 | 4 | 5 | 6 | 7 |
|---|---|---|---|---|---|---|---|
| Amount of gypsum (g) | 5.89 | 514 | 4.09 | 2.28 | 3.42 | 3.42 | 3.27 |
| SiO$_2$/Na$_2$O molar ratio of sodium silicate | 1.8 | 2.2 | 3.0 | 2.6 | 2.6 | 2.6 | 4.0 |
| Concentration of sodium silicate (mole/l) | 0.4065 | 0.3546 | 0.2824 | 0.1572 | 0.2358 | 0.2358 | 0.2252 |
| Feed H$_2$O/(CaO + SiO$_2$) ratio | 30 | 30 | 30 | 60 | 40 | 40 | 30 |
| Temperature of the autoclave | 200 | 200 | 200 | 200 | 180 | 220 | 200 |
| Treating time in autoclave | 5 | 5 | 5 | 5 | 20 | 5 | 5 |
| Specific bulk volume (cc/g) | 13.8 | 16.8 | 14.2 | 18.9 | 17.2 | 11.4 | 9.8 |
| Amount of oil absorption (cc/g) | 4.85 | 5.52 | 4.93 | 6.12 | 5.53 | 4.15 | 3.75 |
| n of nSiO$_2$ . mH$_2$O | 0.48 | 1.26 | 2.86 | 1.90 | 2.00 | 2.00 | 4.82 |
| m of nSiO$_2$ . mH$_2$O | 2.08 | 2.23 | 2.55 | 2.30 | 2.39 | 2.35 | 2.79 |

EXAMPLE 43

The procedure of Example 41 was repeated except that the amount of calcium sulfate dihydrate was changed as shown in Table 9. The results are shown in Table 9.

By observation with an electron microscope (10,000×), it was confirmed that the products obtained in Runs Nos. 3, 4 and 5 were a mixture of petal-like flakes and plate-like II-type anhydrous gypsum, and the products obtained in Runs Nos. 1 and 2 consisted only of petal-like flakes and no substance which appeared to be gypsum could be discerned.

Table 9

| Run No. | 1 | 2 | 3 | 4 | 5 |
|---|---|---|---|---|---|
| Amount of calcium sulfate dihydrate fed (g) | 5.81 | 6.78 | 7.74 | 8.72 | 9.68 |
| $CaSO_4/Na_2O \cdot nSiO_2$ ratio | 1.20 | 1.40 | 1.60 | 1.80 | 2.00 |
| Specific bulk volume (cc/g) | 20.1 | 18.6 | 17.3 | 16.2 | 14.5 |
| Amount of oil absorption (cc/g) | 5.92 | 5.61 | 5.20 | 4.75 | 4.20 |
| Content (%) of gypsum in product | 3.4 | 13.1 | 21.0 | 27.9 | 33.4 |
| n of $nSiO_2 \cdot mH_2O$ | 2.05 | 2.05 | 2.04 | 2.06 | 2.05 |
| m of $nSiO_2 \cdot mH_2O$ | 1.20 | 1.40 | 1.60 | 1.80 | 2.00 |

EXAMPLE 44

Examples 40 and 41 were repeated except that potassium silicate was used instead of sodium silicate. The results of chemical analysis, X-ray diffraction analysis and electron microscopic examination of the products were much the same as those in Examples 40 and 41. The product obtained by the procedure of Example 40 was petal-like calcium silicate of the formula $2CaO.3SiO_2.2.05SiO_2.2.33H_2O$ having an average particle diameter of 2 microns in the longitudinal direction. The product obtained by the procedure of Example 41 was determined to be a petal-like substance composed of a calcium silicate-gypsum composite expressed by the formula $(2CaO.3SiO_2.2.05SiO_2.2.34H_2O)(0.20CaSO_4)$.

COMPARATIVE EXAMPLE 5

Figure 12:
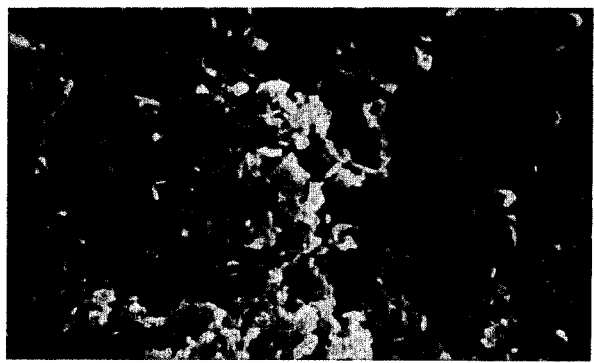
FIG. 12 is an electron microphotograph of a product outside the scope of the invention.

1.45 g of α-type calcium sulfate hemihydrate ($CaSO_4.1/2H_2O$) was added to 50 cc of a 0.2 mole/l aqueous solution of sodium silicate ($SiO_2/Na_2O$ molar ratio=2.6), and they were reacted for 20 hours at 200° C. in an autoclave. The resulting product was dried by the same procedure as in Example 40. An electron microphotograph (10,000×) taken of this product is shown in FIG. 12, from which it is seen that the product was a mass of particles. It is quite different from the calcium silicates of the invention shown in FIGS. 11 and 12.

COMPARATIVE EXAMPLE 6

1000 cc of a 0.4 mole/l slurry of slaked lime was mixed with each of the various siliceous materials shown in Table 10 at 25° C. under atmospheric pressure so that each of the predetermined $SiO_2/CaO$ molar ratio was attained. The water ratio [$H_2O/(CaO+SiO_2)$] was 40.

The slurry was put into an autoclave, and the autoclave was sealed. It was reacted at 200° C. for each of the periods shown in Table 10. The reaction product was treated and dried in the same way as in Example 1 to form a powder. The properties of each of the powders were measured, and the results are shown in Table 10.

Table 10

| Run No. | Siliceous material | $SiO_2/CaO$ molar ratio | Autoclave time (hr) | Specific bulk volume (cc/g) | Amount of oil absorption (cc/g) |
|---|---|---|---|---|---|
| 1 | Diatomaceous earth | 1.6 | 5 | 4.8 | 1.2 |
| 2 | Diatomaceous earth | 1.75 | 5 | 4.8 | 3.2 |
| 3 | Diatomaceous earth | 2.00 | 5 | 7.1 | 2.5 |
| 4 | Diatomaceous earth | 2.50 | 5 | 6.8 | 2.1 |
| 5 | Diatomaceous earth | 1.75 | 5 | 10.4 | 3.7 |
| 6 | Aerosil | 1.75 | 5 | 9.3 | 3.1 |
| 7 | Aerosil | 2.50 | 5 | 6.7 | 2.3 |
| 8 | White carbon | 1.75 | 5 | 7.0 | 2.5 |
| 9 | Quartz | 1.75 | 20 | 3.5 | 0.8 |

In the table, the diatomaceous earth was Radiolite #700 (trademark for a product of Showa Chemical Co. Ltd.) pulverized to a size smaller than 325 mesh; Aerosil was Aerosil #200 (trademark for a product of Nippon Aerosil Co., Ltd.); the white carbon was Tokusil NR (trademark for a product of Tokuyama Soda Co., Ltd.); and the quartz was silica sand (occurring in Seto, Japan) pulverized to a particle size smaller than 325 mesh.

It is clear from the above results that when insoluble siliceous materials were used, the products had a specific bulk volume of at most about 10 cc/g.

What we claim is:

1. A process for producing calcium silicate of the rational formula $2CaO.3SiO_2.nSiO_2.mH_2O$ wherein m is a number of more than 0 and n is a number of 0.1 to 5, said calcium silicate having a petal-like structure, a specific bulk volume of at least 4 cc/g and an amount of oil absorption of at least 2.0 cc/g, which process comprises contacting a water-soluble silicate compound with a calcium compound in an aqueous medium, and heating the resultant mixture at a temperature of 150° to 250° C., the amount of the aqueous medium being 5 to 100 times the weight of the calcium silicate obtained.

2. The process of claim 1 wherein the water-soluble silicate compound is a water-soluble alkali metal silicate.

3. The process of claim 2 wherein the amount of the calcium compound is 1.05 to 1.4 equivalent per equivalent of the alkali moiety in the alkali metal silicate.

4. The process of claim 1 wherein the calcium compound is selected from the group consisting of calcium chloride, calcium hydroxide, calcium nitrate, quicklime and gypsum.

5. The process of claim 1 wherein the aqueous medium is water.

6. The process of claim 1 wherein the amount of the aqueous medium is 15 to 70 times the weight of the calcium silicate obtained.

7. The process of claim 1 wherein the heating is carried out at 170° to 210° C.

8. A process for producing calcium silicate of the rational formula $2CaO. 3SiO_2.nSiO_2.mH_2O$ wherein m is a number of more than 0 and n is a number of 0.1 to 5, or producing a composite of said calcium silicate and gypsum, said calcium silicate and said composite having a petal-like structure, a specific bulk volume of at least 4 cc/g and an amount of oil absorption of at least 2.0 cc/g, which process comprises adding a water-soluble alkali metal silicate or its aqueous solution gradually to an aqueous suspension of gypsum, and heating the mixture at a temperature of 150° to 250° C.

9. The process of claim 8 wherein the water-soluble alkali metal silicate is an alkali metal silicate of the rational formula $R_2O.lSiO_2$ wherein R is sodium or potassium and l is a number of 1.55 to 6.5.

10. The process of claim 8 wherein the gypsum/alkali metal silicate molar ratio is from 1.0 to 1.5.

11. An adsorbent carrier comprising the calcium silicate or the calcium silicate-gypsum composite produced by the process of any one of claims 1 to 10.

12. A delusterant comprising the calcium silicate or the calcium silicate-gypsum composite produced by the process of any one of claims 1 to 10.

13. A filtration aid comprising the calcium silicate or the calcium silicate-gypsum composite produced by the process of any one of claims 1 to 10.

* * * * *